Jan. 1, 1957

E. W. TURNQUIST ET AL 2,776,031

ADJUSTABLE PRESSURE PLATE ASSEMBLY FOR
MULTIPLE DISC FRICTION CLUTCHES

Filed May 21, 1954

2 Sheets-Sheet 1

INVENTORS
EDWIN W. TURNQUIST
ROBERT L. WILSON

BY

ATTORNEY

INVENTORS
EDWIN W. TURNQUIST
ROBERT L. WILSON

ATTORNEY

United States Patent Office 2,776,031
Patented Jan. 1, 1957

2,776,031

ADJUSTABLE PRESSURE PLATE ASSEMBLY FOR MULTIPLE DISC FRICTION CLUTCHES

Edwin W. Turnquist and Robert L. Wilson, Broken Arrow, Okla., assignors to J. E. Mabee, Tulsa, Okla.

Application May 21, 1954, Serial No. 431,438

8 Claims. (Cl. 192—48)

This invention relates to multiple disc friction clutches of the type including alternating driving and driven friction discs, such as commonly used in reversing mechanisms. More particularly, the invention consists in new and useful improvements in a multiple disc friction clutch provided with a novel adjusting nut in an adjustable pressure plate assembly, designed to permit a greater amount of torque to be transmitted by the clutches and adaptable for dual or single application.

The primary object of the invention is to provide an improved adjusting nut and pressure plate assembly for use in connection with a friction clutch of the multiple disc type and comprising two cooperating annular plates or flanges, separated by a sereies of springs interposed between the plates under tension, a slidable collar and cam mechanism, operating through the adjusting nut assembly, to set the disc clutch into operation.

Another object of the invention is to provide a spring loaded adjusting nut assembly for use with multiple disc friction clutches to provide increased torque by permitting the friction disc of the clutch to wear to a maximum degree with a minimum reduction in the amount of torque that can be delivered by the clutch.

Still another object of the invention is to provide an adjusting nut assembly including a pair of adjusting nut units of identical form, spaced longitudinally on the shaft to be controlled, and having a common actuating mechanism interposed therebetween, so that by a shifting of the operating mechanism, either one or the other of said units is set into motion to operate respective clutches of a dual system.

With the above and other objects in view which will appear as the description proceeds, the invention consists in the novel features herein set forth, illustrated in the accompanying drawings and more particularly pointed out in the appended claims.

Figure 1:
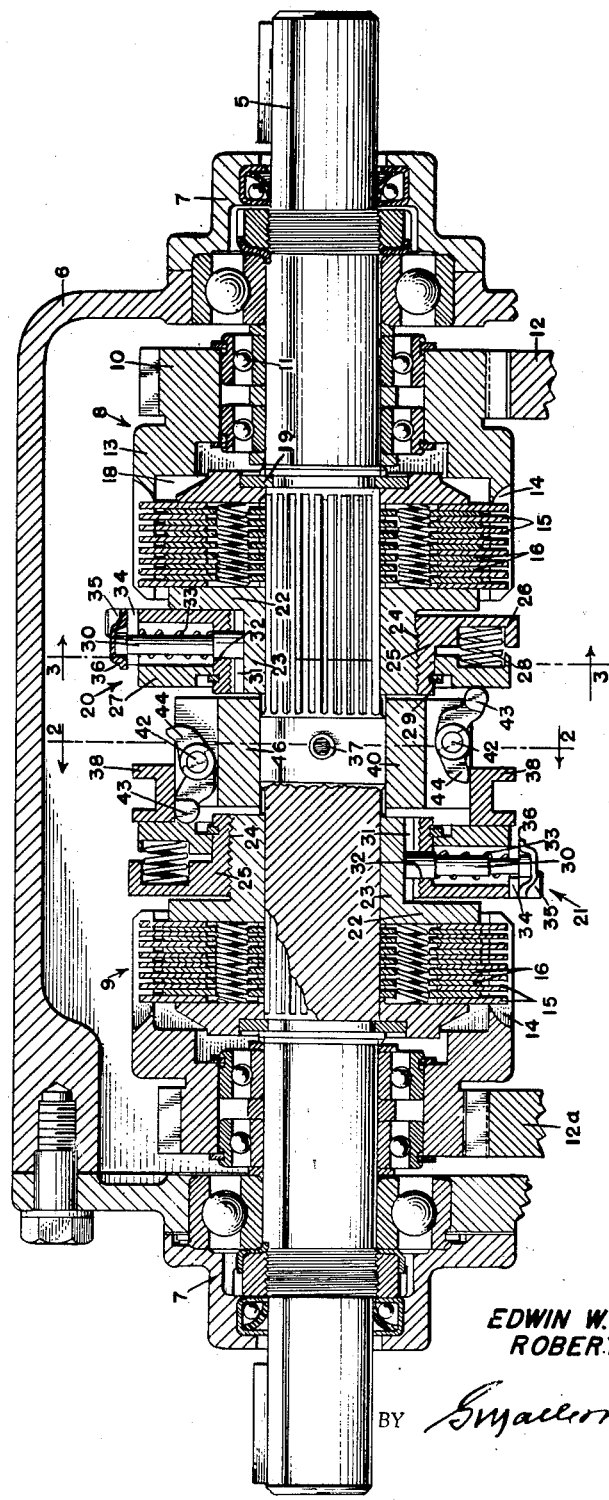

Referring to the drawings in which numerals of like character designate similar parts throughout the several views, Figure 1 is a longitudinal sectional view of one form of the present invention, as applied to a dual clutch installation.

Figure 2:
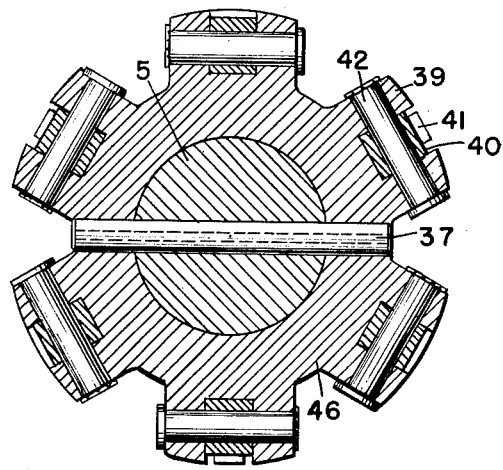
Figure 3:
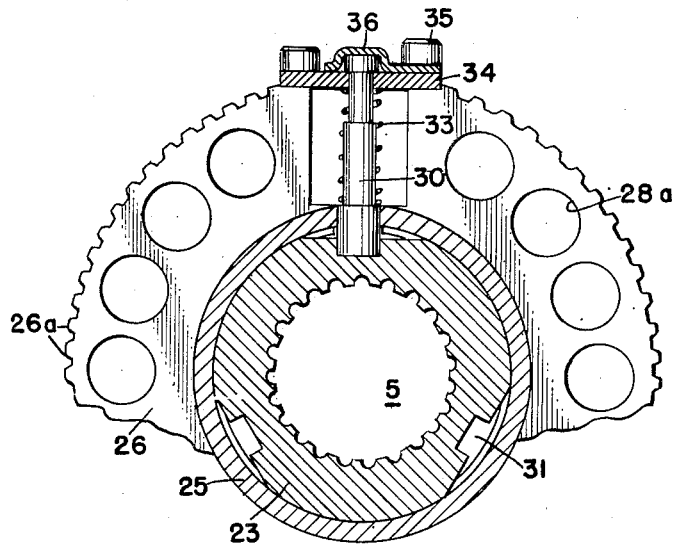

Figure 2 is a transverse sectional view of the adjusting nut actuating mechanism, taken on line 2—2 of Figure 1 and Figure 3 is a transverse sectional view through one of the adjusting nut units, taken on line 3—3 of Figure 1.

The actual invention here involved, concerns the pressure plate adjusting nut units or units and their relationship to conventional multiple disc friction type clutches and while these units may be adapted for use in connection with various clutch-driven mechanisms, for purposes of illustration, the drawings show an embodiment comprising two friction clutches adapted to selectively rotate a driven shaft respectively in opposite directions. In this embodiment, two similar adjusting nut units are employed, one for each clutch, and under the control of a common actuating member.

In the drawings, referring first to Figure 1, 5 represents a driven shaft which may be operatively connected for driving any mechanism (not shown) where a reversible operation is desired. The shaft is mounted in a housing 6 and supported at each end in suitable bearing assemblies 7. In the adaptation of the invention here shown, the shaft 5 carries two identical friction disc clutch units 8 and 9 which will later appear, are adapted to drive the shaft 5, respectively in opposite directions.

One clutch 8 consists of a driven gear 10, coaxially mounted on the shaft 5 by means of roller bearings 11 and operatively connected to a driving gear 12, a fragment of which is shown in Figure 1. Integral with the driven gear 10 and also coaxial with the shaft 5, is a friction disc receiving drum 13 in the form of an annular rim provided around its periphery with a series of transverse slots 14 which operatively engage complementary peripheral notches in each of a series of outer friction driving discs 15, to affect rotation of the latter upon rotation of the gear 10 and drum 13. Interposed between each pair of outer discs 15, is an inner friction driven disc 16, suitably keyed to the shaft 5, the usual series of springs 17 being disposed in complementary openings extending transversely through the combined disc assembly. Thus, when the discs are compressed between pressure plates in the conventional manner, the rotation of the gear 10 and drum 13 is transmitted to the shaft 5.

One pressure plate 18 is fixed with respect to the shaft 5 and held in place by a key ring 19, serving as an abutment against which the series of discs 15 and 16 are compressed against the tension of springs 17.

The adjsutment nut and pressure plate assemblies comprising the main feature of the invention and of which two are used in the dual embodiment shown, are represented generally by the numerals 20 and 21. Each of these assemblies consists of a main clutch pressure plate 22 which abuts the outermost driving disc 15 of the clutch member and is provided with a hub 23 which is splined to the shaft 5 and longitudinally slidable thereon. The outer periphery of the hub 23 is threaded as at 24 to receive complementary internal threads on the annular base 25 of a radial spring plate 26. A second radial spring plate 27 is slidably mounted on the outer periphery of the base 25 with a series of coil springs 28 interposed between the adjacent faces of the plates 26 and 27. The springs 28 are preferably inset at opposite ends in suitable spring wells formed in the opposed faces of the two plates and the limit of movement of the slidable plate 27 in a direction away from plate 28, is determined by a snap ring 29, fitted into a groove in the outer periphery of the base 25.

The relative position of the spring plate assembly 26—27 may be adjusted axially on the hub 23, by the screw-threaded arrangement 24 and in order to lock this assembly at a selected adjustment, we provide a radially disposed spring pressed plunger 30, supported between the two plates 26 and 27 in a suitable recess with its inner end adapted to engage any one of a series of milled longitudinal slots 31, formed in the outer periphery of the hub 23. The inner end of the plunger 30 slidably embraces an opening 32 in the base 25 and under the tension of spring 33, is forced into the selected milled slot 31. The spring 33 is retained in the recess between the plates 26 and 27 by a slotted yoke 34, bolted to the peripheral edge of plate 26, by a cap screw 35. As an additional safeguard to prevent the plunger from disengaging the slot 31, by the action of centrifugal force, a cap 36, also held in place by cap screw 35, overlies the head of the plunger 30.

As previously stated, the construction and assembly of the two adjusting nut and pressure plate assemblies 20 and 21 is identical and it is therefore unnecessary to describe the assembly 21 which is mounted on the shaft 5 in longitudinally spaced relation to the assembly 20, as seen in Figure 1. Interposed between the two assemblies 20 and 21 is a hub 46 which is connected to the shaft 5 by a pin 37 extending transversely through the hub and shaft. A peripherally grooved operating collar 38 is slidably mounted on the hub 46 for selective engagement with the opposed spring plates 27 of respective assemblies 20 and 21, conventional means (not shown) cooperating with the peripheral groove to shift the collar from one position to the other.

As seen in Figures 1 and 2, the hub 46 is provided with a series of radial projections 39, each of which is slotted from its periphery as at 40, to receive a cam member 41 supported by a transverse pin 42.

These cam members are rockably mounted on the pins 42 and in the dual embodiment of the invention shown, are alternately arranged so that one eccentric camming arm 43 engages the movable plate 27 of one unit 20, while the alternate eccentric camming arm is reversed and engages the corresponding movable plate 27 of the other unit 21. As best seen in Figure 1, the opposite end of each cam member 41 is provided with a relatively short tail member 44 which normally projects from its slot, beyond the periphery of the hub 46 in line for engagement by the approaching edge of the collar 38 as it slides over the hub. The spacing between the cam arm 43 and the tail 44 is such with relation to the width of the ring 38, that as the latter approaches the tail 44, it disengages the cam arm 43 and engages the tail 44 with the result that the tail is depressed and the cam arm 43 elevated to disengage the spring plate 27. Movement of the collar 38 in the opposite direction disengages the tail 44 and urges the cam arm 43 into engagement with the adjacent face of the movable plate 27 to cause a gradual compression of the springs 28 and a simultaneous sliding movement of the pressure plate 22 to compress the friction discs of the selected clutch assembly 8 or 9, depending upon the direction of movement of the collar 38.

As previously mentioned, the clutch assemblies 8 and 9 are assembled for rotation in opposite directions respectively, so as to affect reverse rotation of the shaft 5 upon the proper shifting of the collar 38 and activation of the selected clutch. The method of driving the driven members of the clutches forms no part of the present invention but in an embodiment such as that shown in Figure 1, two main driving gears are provided, one for each driven gear of the clutches. One of these driving gears 12 has already been referred to and a similar gear 12a is operatively connected to the driven gear 10 of clutch assembly 9. In order to affect the reverse rotation of the two clutch members, if the two gears 12 and 12a are driven from a common source of power, it would be necessary to connect these two gears through an intermediate gear which would cause gear 12 to rotate in one direction while gear 12a is simultaneously rotating in the opposite direction. This mechanism is not shown but any conventional gearing arrangement could be employed for this purpose and many are known to those skilled in the art.

Thus, with gear 12 rotating in clockwise direction for example, and gear 12a rotating in counterclockwise direction, the driven gears 10 and connected drums 13 of the two clutch units, would correspondingly rotate in opposite directions. Upon shifting movement of the collar 38 to the left as in Figure 1, the alternate cam arms 43, positioned to coact with the plate 27 of unit 9, would be cammed into compressing relation to force the pressure plate 22 of that unit into engagement with the friction discs of the clutch so that the shaft 5 would partake of a clockwise rotation in response to the counterclockwise rotation of the driving gear 12a. During this rotation the plate 27 of unit 20 has been released by the retraction of the cam arms associated with that plate.

Thus, the clutch unit 8 simply idles under tthe rotation of the clockwise gear 12.

The reverse operation of the collar 38 cams the opposite cam arms 43 into engagement with the plate 27 of unit 20, compressing the pressure plate 22 of clutch unit 8 and causing the counterclockwise rotation of the shaft 5 through the clockwise rotation of gear 12.

When the collar 38 is shifted to neutral or intermediate position on the hub 46, the cam arms of all cam members are retracted, permitting both clutch members to idle, leaving the shaft 5 in stationary position.

By releasing either of the locking plungers 30 from an engaged slot 31, the respective spring plate assembly 26—27 may be adjusted axially on its hub 23, through the complementary screw threads on the base 25 and hub 23. Thus, wear on the clutch discs can be compensated for, to a considerable degree, without repairs.

While we have shown and described this adjusting nut assembly as used in a dual assembly, it will be understood that single units may be employed for simply operating and releasing individual clutch units. In this event, the hub 36 would be provided with only one set of cam members 41 with all cam arms 43 directed toward the spring plate 27 of the adjusting nut assembly.

It will thus be seen that with this improved adjusting nut assembly an increased torque is possible due to the fact that the spring loaded adjusting nut allows the friction discs of the clutch to wear to a considerable degree without an appreciable reduction in the amount of torque that can be delivered by the clutch. This advantage results from the additional compression afforded by the springs 28 and the particular arrangement of the adjusting nut parts with respect to the pressure plate, which minimizes the adjustment required due to wear of the clutch discs.

From the foregoing it is believed that the invention may be readily understood by those skilled in the art, without further description, it being borne in mind that numerous changes may be made in the details of construction without departing from the spirit of the invention as set forth in the following claims.

What we claim is:

1. In a friction clutch including driving and driven members, having normally released, coacting friction means, one of said members consisting of a shaft arranged coaxially of the other member, an adjustable pressure plate assembly, comprising a first sleeve splined on said shaft for longitudinal movement thereon, a radial pressure flange at one end of said first sleeve for engagement with said friction means, said sleeve having a series of external threads, an internally threaded second sleeve engaging the threads on said first sleeve and thereby adjustable axially thereon, a radial spring retaining flange integral with one end of said second sleeve, an annular spring plate axially slidable on said second sleeve in opposed relation to said spring retaining flange, spring means interposed between said last named flange and spring plate and normally urging the two apart, cam means for urging said spring plate toward said spring retaining flange in opposition to said spring means, an actuator for said cam means, and means for locking said second sleeve in a selected adjustment on said first sleeve.

2. In a friction clutch including driving and driven members, having normally released, coacting friction means, one of said members consisting of a shaft arranged coaxially of the other member, an adjustable pressure plate assembly, comprising a first sleeve splined on said shaft for longitudinal movement thereon, a radial pressure flange at one end of said first sleeve for engagement with said friction means, said sleeve having a series of external threads, an internally threaded second sleeve engaging the threads on said first sleeve and thereby adjustable axially thereon, a radial spring retaining flange integral with one end of said second sleeve, an annular spring plate axially slidable on said second sleeve in opposed relation to said spring retaining flange, spring means interposed between said last named flange and spring plate and normally urging the two apart, cam means for urging said spring plate toward said spring retaining flange in opposition to said spring means, a clutch actuating mechanism comprising a hub keyed on said shaft adjacent said pressure plate assembly, cam means carried by said hub and engageable with said spring plate, a cam actuating ring embracing said hub and axially slidable thereon into and out of engagement with said cam means, and means for locking said second sleeve in a selected adjustment on said first sleeve.

3. Apparatus as claimed in claim 2, wherein said locking means comprises a spring pressed plunger, slidably supported in a radial opening in said second sleeve, and a series of longitudinal slots in the periphery of said first sleeve for selectively receiving said plunger.

4. Apparatus as claimed in claim 3, including means for retaining said plunger in locking position.

5. In combination with a driven shaft and coaxial friction disc clutch, an adjustable pressure plate assembly, comprising a pressure plate slidably splined on said shaft for direct engagement with said disc clutch, an oppositely disposed central extension on said plate forming a threaded hub, an annular spring plate having a threaded base extension for engagement with said hub, a second annular spring plate slidably mounted on said base extension in opposed relation to said first spring plate, springs interposed between said spring plates, normally urging them apart, cam means carried by said shaft for applying pressure to said second spring plate, against the tension of said springs, an operating ring for actuating said cam means, and means for locking said first spring plate in a selected longitudinal adjustment on said hub.

6. The combination as claimed in claim 5, wherein said cam means comprises a series of radially disposed cam arms, pivotally mounted on a supporting hub keyed to said shaft, said cam arms being projectible and retractible with respect to said second spring plate, by the sliding engagement of said operating ring.

7. The combination as claimed in claim 5, including two oppositely rotatable friction disc clutches on said shaft and separate, adjustable pressure plate assemblies for respective clutches.

8. The combination as claimed in claim 7, including a common operating ring interposed between said pressure plate assemblies.

References Cited in the file of this patent

UNITED STATES PATENTS

| 2,090,397 | Haupt | Aug. 17, 1937 |
| 2,140,619 | Dunkelow | Dec. 20, 1938 |
| 2,322,326 | Taylor | June 22, 1943 |

FOREIGN PATENTS

| 423,621 | Italy | June 4, 1947 |
| 569,610 | Great Britain | Dec. 1945 |